(12) United States Patent
Sears

(10) Patent No.: US 6,663,770 B2
(45) Date of Patent: Dec. 16, 2003

(54) WATER PROCESSING DEVICE

(76) Inventor: Stephan B Sears, 1021 Fife Ave., Palo Alto, CA (US) 94301

( * ) Notice: Subject to any disclaimer, the term of this patent is extended or adjusted under 35 U.S.C. 154(b) by 40 days.

(21) Appl. No.: 09/991,569

(22) Filed: Nov. 16, 2001

(65) Prior Publication Data

US 2002/0074275 A1 Jun. 20, 2002

Related U.S. Application Data

(60) Provisional application No. 60/249,811, filed on Nov. 17, 2000.

(51) Int. Cl.⁷ .............................. B01D 3/02; B01D 19/00
(52) U.S. Cl. ........................ 210/175; 210/180; 210/259
(58) Field of Search ................................. 210/175, 180, 210/181, 259; 202/176, 181, 193, 196, 197, 163, 269; 203/10, 21, 22, 23, 25, 27, DIG. 8, DIG. 17

(56) References Cited

U.S. PATENT DOCUMENTS

| | | | | |
|---|---|---|---|---|
| 3,245,883 A | * | 4/1966 | Loebel | 203/7 |
| 3,405,037 A | * | 10/1968 | Aronson et al. | 202/173 |
| 3,857,704 A | * | 12/1974 | Coulter | 75/721 |
| 3,890,205 A | | 6/1975 | Schnitzer | |
| 4,030,985 A | * | 6/1977 | Barba et al. | 202/174 |
| 4,036,594 A | * | 7/1977 | Ibing et al. | 422/255 |
| 4,344,825 A | * | 8/1982 | Colwell | 203/1 |
| 4,585,167 A | | 4/1986 | Kholin | |
| 4,696,718 A | * | 9/1987 | Lasater | 202/176 |
| 4,698,136 A | | 10/1987 | El-Allawy | |
| 4,764,192 A | * | 8/1988 | Heisel et al. | 96/201 |
| 4,978,429 A | | 12/1990 | Sears et al. | |
| 5,156,706 A | * | 10/1992 | Sephton | 159/47.1 |
| 5,248,394 A | | 9/1993 | Schlesinger et al. | |
| 5,810,976 A | * | 9/1998 | Keith | 202/182 |
| 5,858,177 A | * | 1/1999 | Morris | 203/26 |
| 5,968,321 A | * | 10/1999 | Sears | 202/172 |
| 6,365,005 B1 | * | 4/2002 | Schleiffarth | 203/1 |

* cited by examiner

Primary Examiner—Fred G. Prince
(74) Attorney, Agent, or Firm—Mandel & Adriano

(57) ABSTRACT

A water processing device for removing contaminants from water for consumption, consisting of: 1) a heat exchanger; 2) a heater; 3) a boiler chamber; 4) a liquid level control device; 5) a demister; 6) a degasser; and, 7) a self-cleaning component. A water seal to prevent steam from leaking from the device is also provided.

5 Claims, 13 Drawing Sheets

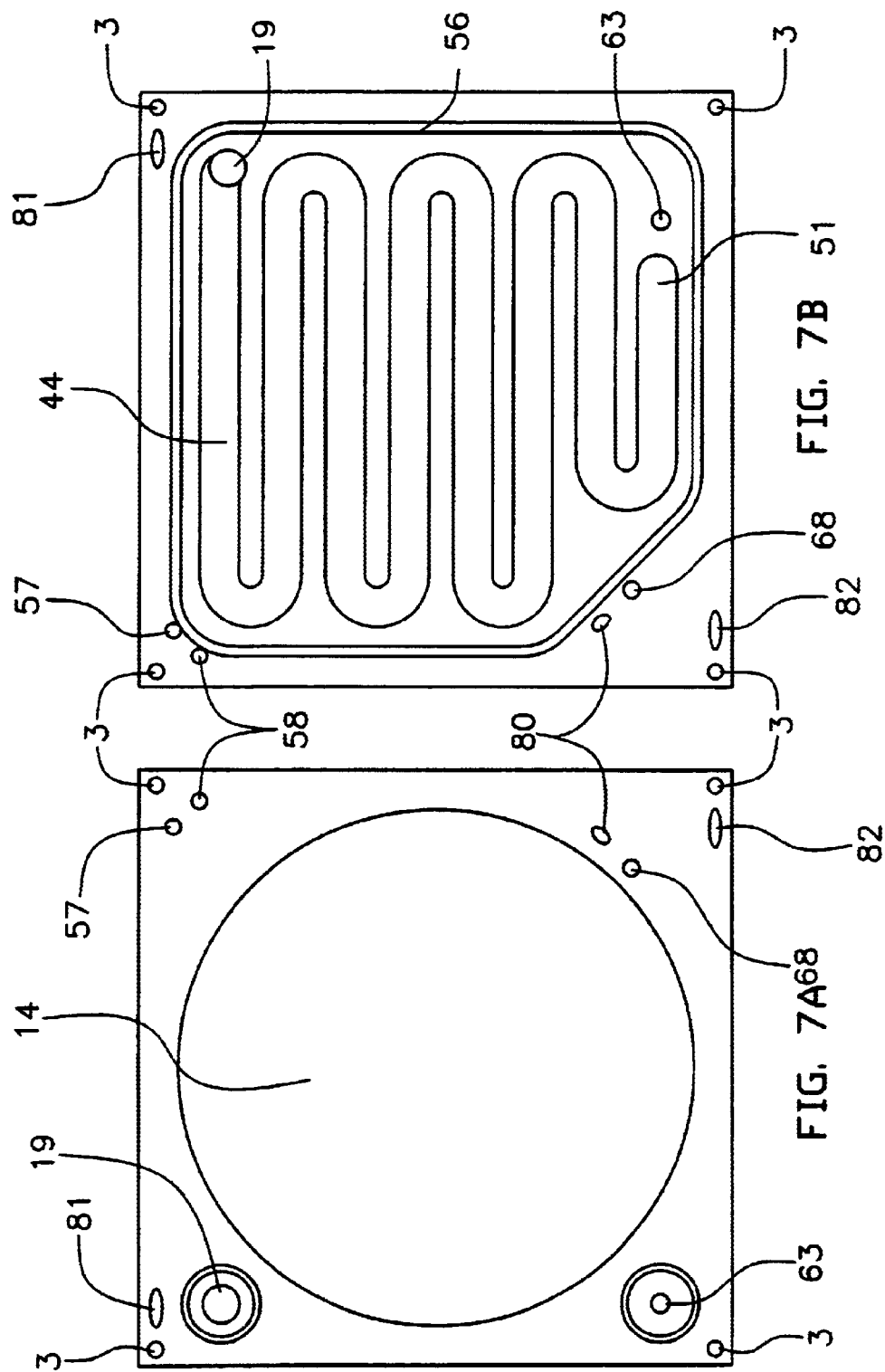

WATER PROCESSING DEVICE

This application claims the priority of provisional patent application U.S. Serial No. 60/249,811, filed Nov. 17, 2000, the contents of which are incorporated by reference in their entirety, into the present application.

Throughout this application various publications are referenced. The disclosures of these publications in their entireties are hereby incorporated by reference into this application in order to more fully describe the state of the art to which this invention pertains.

FIELD OF THE INVENTION

The present invention relates to a new, point of use water processing device for removing impurities from fluids such as water for consumer use.

BACKGROUND OF THE INVENTION

The earth is largely water with only a tiny fraction available for drinking or irrigation. The majority of the water is contained in our oceans and is too salty for human consumption. Most of the water currently used for drinking and irrigation is fresh water at less than half of 1% of the global water supply. A considerable number of people on earth lack clean drinking water, with contaminated drinking water involved in a large percentage of all human illness and disease including gastroenteritis, dysentery, cholera and other waterborne diseases which claim many human lives each year. Abundant, clean water can improve the lives of rural dwellers worldwide.

The water supply systems in the United States are under increasing strain with reoccurring drought and contamination. Water is being removed from underground reservoirs known as aquifers too fast to allow for rainwater to refill these resources. Moreover, purification efforts of ocean water are presently insufficient to provide an adequate supply of fresh water.

Problems of water scarcity are intensified by pollution of our fresh water supplies. In the United States, trihalomethane gases, known to cause cancer in laboratory animals, contaminate virtually all of our drinking water as a result of the chlorination process that city water systems use to prevent the spread of waterborne diseases. Trihalomethanes form when chlorine interacts with algae, microorganisms or other organic materials in the water. Other contaminants originate in the delivery system- lead from water pipes leach into our tapwater. Pollutants are also contaminating groundwater. Salt thrown on icy roadways has worked its ways into aquifers in New England, and wells are vulnerable to contamination from dumped toxic chemicals, including pesticides. Once groundwater is contaminated, it stays contaminated for many, many years.

People have relied on distillation as a separation technique to purify water for thousands of years. Distillation is a process of evaporation and condensation which involves boiling the feed liquid, moving its vapors to a different location, and condensing the vapors to obtain pure water product. The portion of the feed liquid that does not boil off becomes concentrated. This concentrated liquid known as "blowdown," carries impurities out. The problem with distillation is the extremely high amount of energy it takes to boil water. About 1200 BTU per gallon (1.5 kwh per liter) are required to heat the feed water from 60° F. (16° C.) to 212° F. (100° C.), its boiling point. After feed water reaches its boiling point, about 8000 BTU (2.3 kwh) of heat energy are required to convert a gallon of it to steam.

In the past, people have purified water for consumption using a home distillation apparatus known as a still. Conventional tapwater stills consist of a boiling chamber, a condensing chamber, and an electric heater. The heater boils the impure water. Steam travels to the condensing chamber and condenses, becoming distilled water. These stills remove solid pollutants that contaminate the drinking water. But such stills won't remove toxic gases or liquids, which bubble off with the escaping steam, contaminating the product water.

There remains an urgent need for an efficient, point of use device which is simple to manufacture and use for processing water to remove impurities.

SUMMARY OF THE INVENTION

Accordingly, the present invention provides a point of use water processing device that can produce multiple gallons of pure water from impure water over twenty four (24) hours using reasonable amounts of electrical power. The device removes contaminating solids, liquids and gases from the incoming impure water.

BRIEF DESCRIPTION OF THE DRAWINGS

FIGS. 7A and 7B is a top (FIG. 7A) and bottom (FIG. 7B) view of the upper plate of the heat exchanger having a cavity for the heater (FIG. 8) and flow directing water channels.

DETAILED DESCRIPTION OF THE INVENTION

The present invention provides a water processing device that can be operated continuously with reasonable energy usage and provides removal of contaminating solids, liquids and gases from water for consumption.

Figure 1:
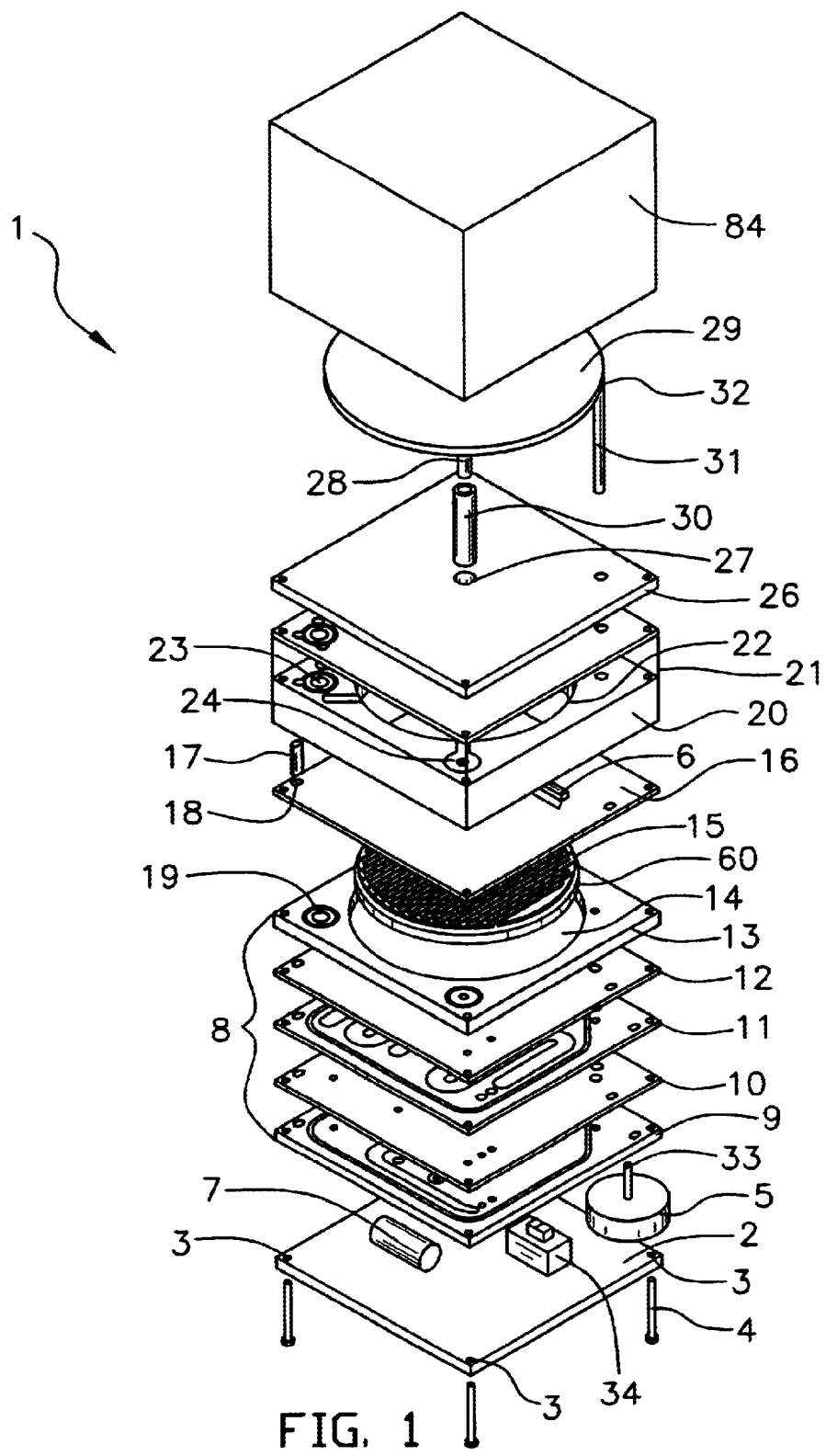
FIG. 1 is an exploded view of the water processing device of the invention showing the components described in detail infra.
Figure 2:
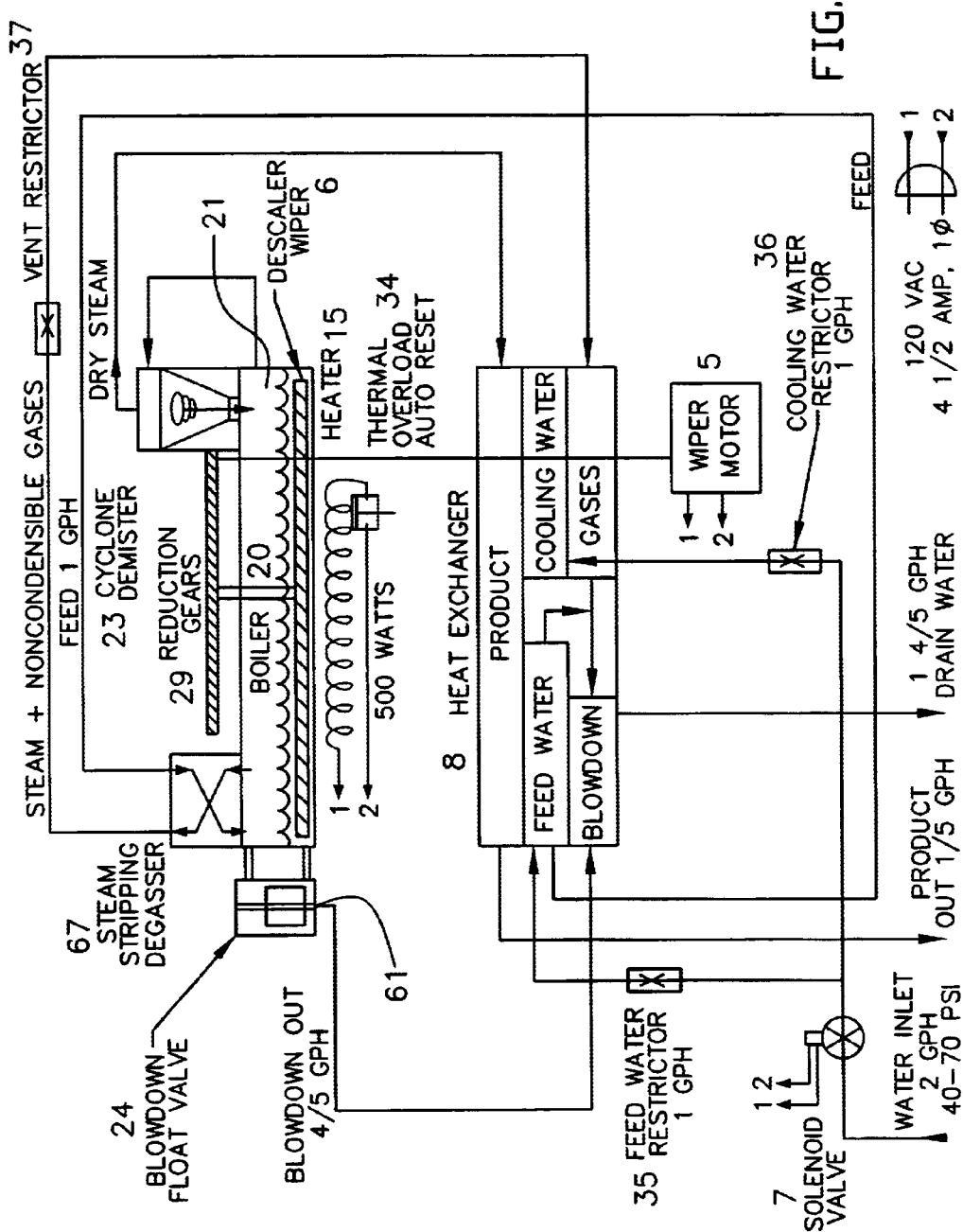
FIG. 2 is a diagrammatic depiction of the water processing device of the invention, described in detail, infra.

The device incorporates several key structural elements that provide optimal purification for a given inflow of water and energy consumption. These key structural elements are: 1) a heat exchanger; 2) a heater; 3) a boiling chamber; 4) a liquid level control device; 5) a demister; 6) a degasser; and, 7) a self-cleaning component. The device provides the advantage of boiling water only after noncondensible gases and volatile liquids have been removed by the degasser, reducing the presence of these contaminants in the final processed water. FIGS. 1 and 2 illustrate the relationship of these elements in the water processing device 1 of the invention.

Referring to FIG. 1, and moving from the base of the water processing device to the top, the device 1 includes a bottom plate 2 having apertures 3 for fastening bolts or screws 4. Wiper motor 5 for rotating the wiper 6 of the self-cleaning mechanism of the device is positioned above bottom plate 2. A feed solenoid valve 7 is preferably included above bottom plate 2 for controlling water flow on and off by electrical current.

Heat exchanger 8 consists of the following components: 1) a lower plate 9 having a water channel for flow of blowdown and vented noncondensible gases and steam from the degasser; 2) a feed water/blowdown heat exchange plate 10; 3) a feed/cooling water channel plate 11; 4) a product/feed water heat exchange plate 12; and 5) an upper plate with heater cavity 14 and product water flow channel 13 (see also FIGS. 3–7). Above the upper plate 13 is the heater 15 (see also FIG. 8), under the boiler surface plate 16.

Above the boiler surface plate 16, steam tube 17 is inserted in aperture 18 to conduct steam from the cyclone demister 23 to the heat exchanger 8.

Figure 10:
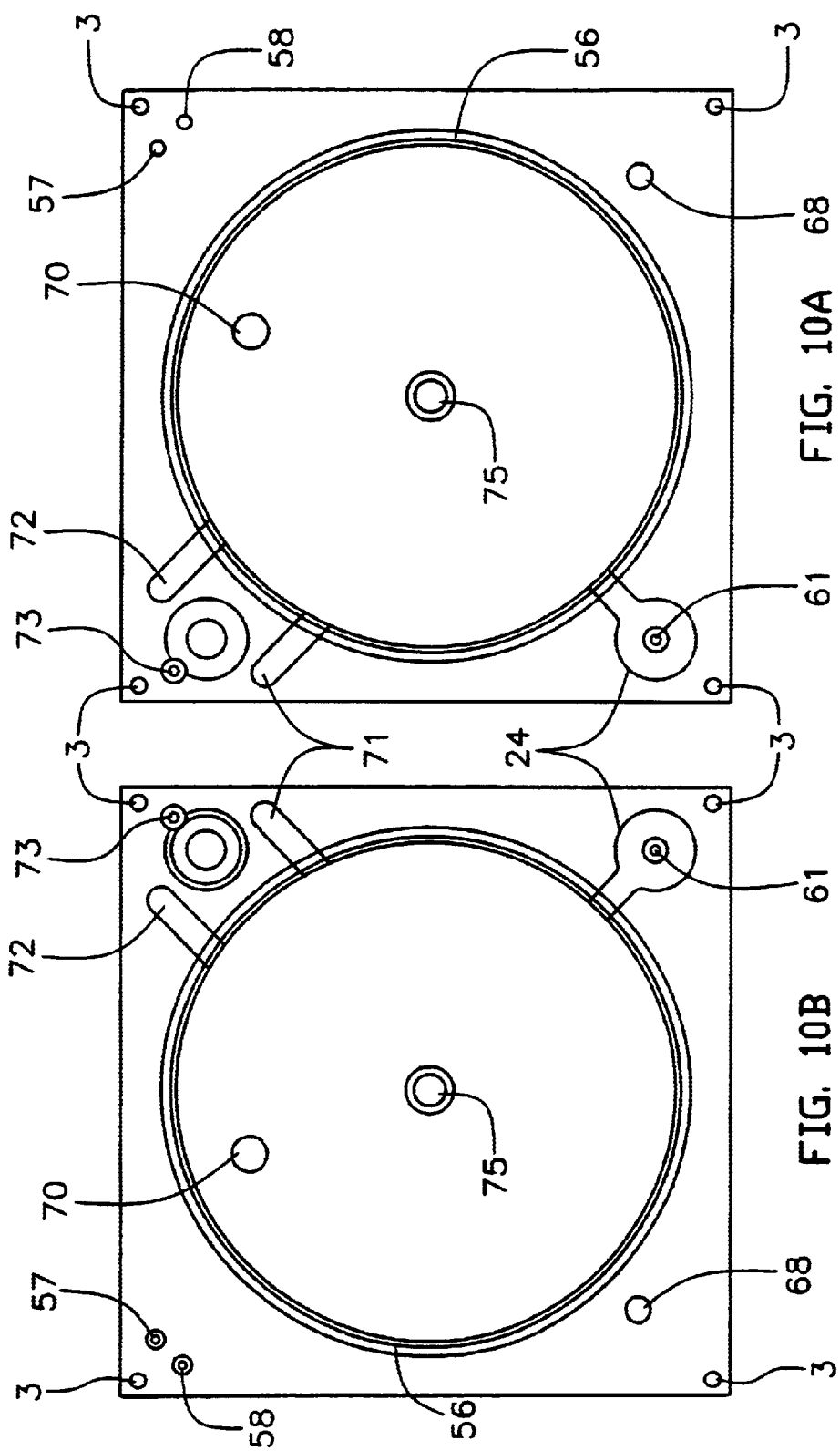
FIGS. 10A and 10B is a top (10A) and bottom (10B) view of the boiler chamber of the water processing device mounted on top of the boiler surface plate (FIG. 9).
Figure 11:
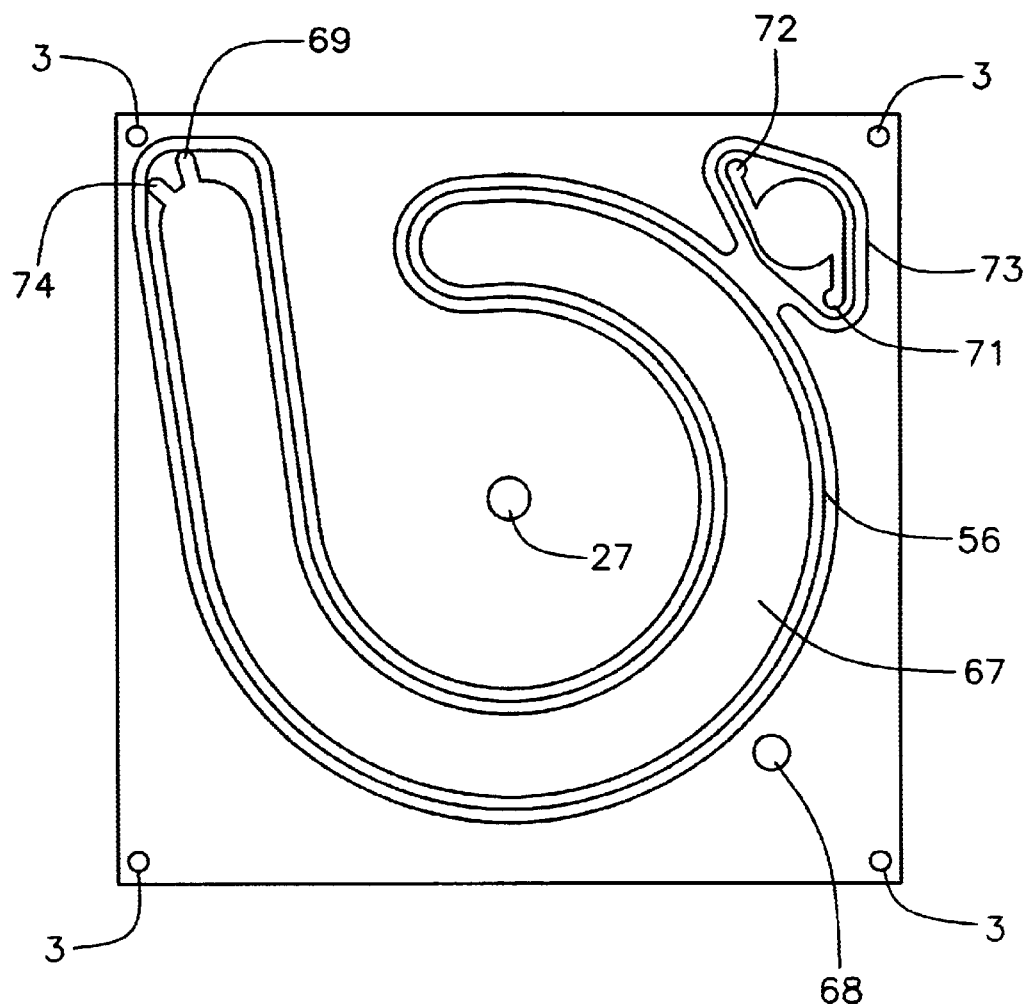
FIG. 11 is a bottom view of the demister/degasser plate (FIG. 1) of the water processing device of the invention, showing the demister and degasser flow channel for the feed water.
Figure 12:
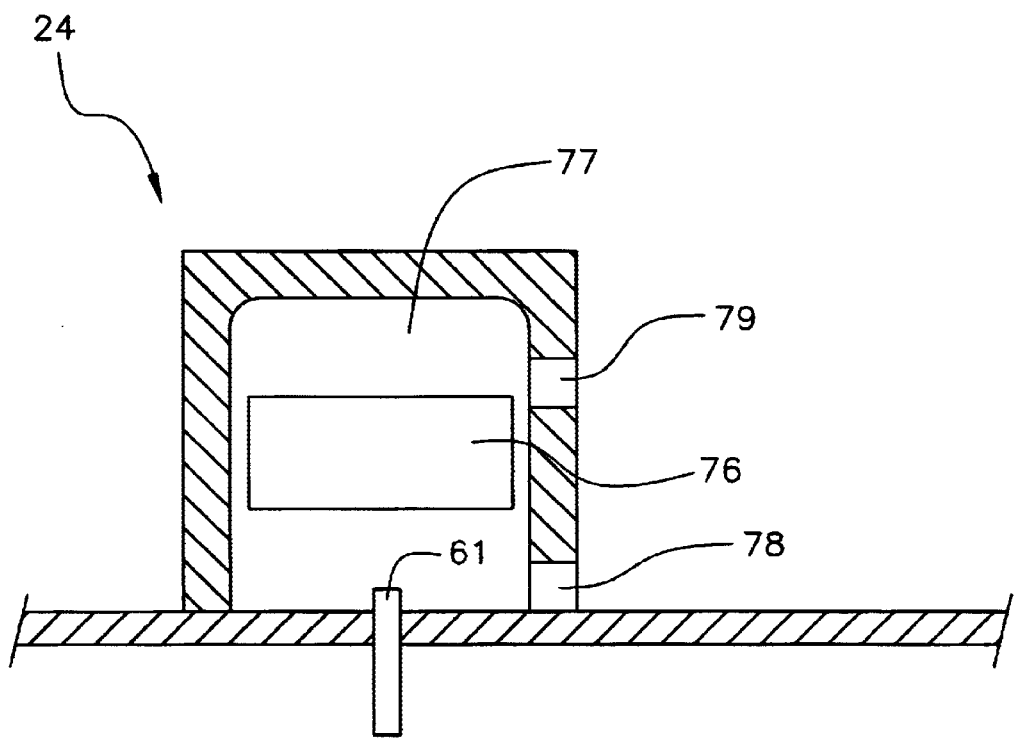
FIG. 12 is a cross-section of the float valve depicted in FIG. 12 showing the float, and conduits for steam and blowdown.

Boiler 20 consists of the boiler surface plate 16 in contact with wiper 6, boiler chamber 21 having a cavity 22, cyclone demister 23 and float valve 24 (FIGS. 10, 11 and 12). The boiler 20 includes top plate 25 that is preferably formed in one piece with the boiler chamber 21. Above the boiler chamber 21 is a demister/degasser plate 26 (FIG. 11) having an aperture 27 for gear shaft 28 of reduction gear 29 encased in water seal 30.

Figure 13:
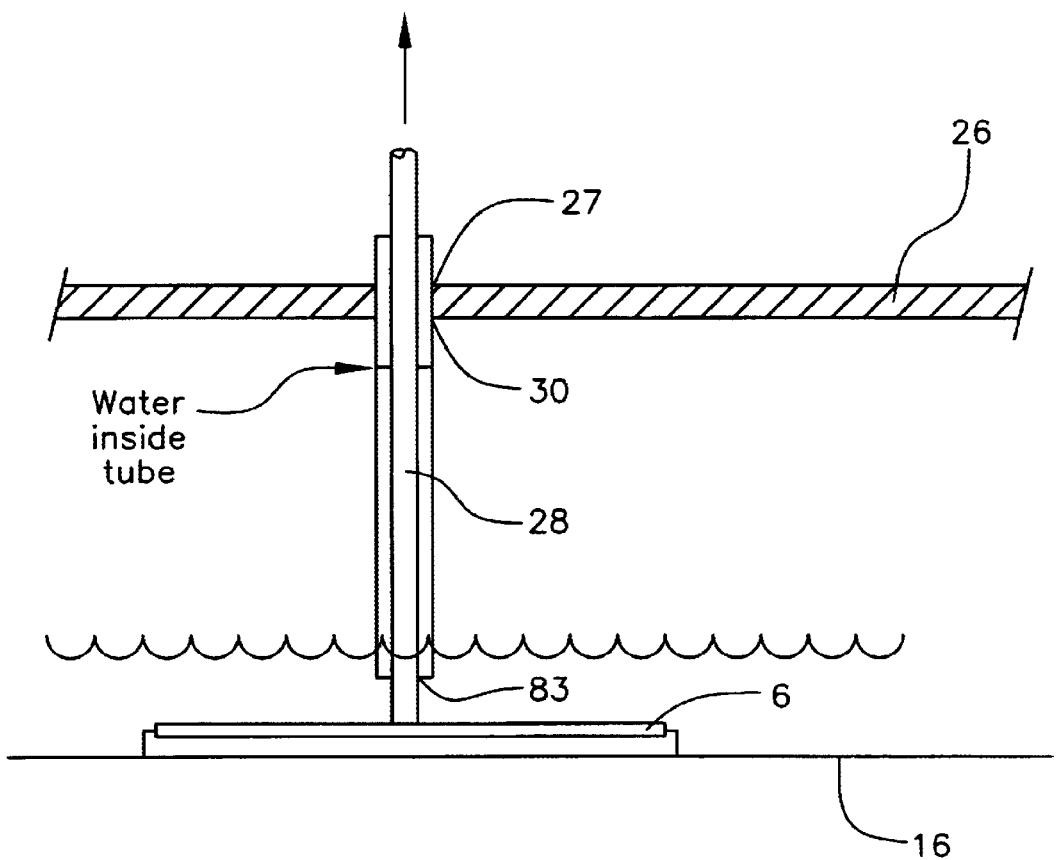
FIG. 13 is a cross-section of the water seal tube and wiper mechanism located in the boiler chamber.

Reduction gear 29 is driven by pinion gear 32 which is mounted to shaft extension 31 for connecting to wiper motor shaft 33 to rotationally operate wiper 6 to contact and clean the surface of the boiler surface plate 16 (see also FIG. 13).

A cover 84 may be placed over the top of the device 1 covering the processing device 1.

Holes 3 for screws or bolts 4 are positioned near the four (4) corners of the components of the device, including the bottom plate 2, lower plate 9, feed water/blowdown heat exchange plate 10, feed/cooling water channel plate 11, product/feed water heat exchange plate 12, upper plate 13 of the heat exchanger, boiler surface plate 16, boiler chamber 21, and demister/degasser plate 26.

FIG. 2 depicts diagrammatically the relationship of the various components of the device 1 of the invention and will be described with reference also to FIG. 1. As shown in FIG. 2, water entering for processing ("inlet water") enters the water processing device of the invention 1 and is split into 1) feed water that enters into the heat exchanger 8 (FIG. 1); and 2) cooling water that enters into the heat exchanger 8. In the heat exchanger 8, the cooling water is used to reduce the temperature of product water exiting from the cyclone demister 23 and vented gases and steam exiting from the degasser channel 67 (FIG. 11). The degasser channel 67 removes gases and volatile liquids present in the feed water that otherwise would exit with the steam from the cyclone demister 23 and contaminate the product water. The feed water is heated to boiling temperature by heat exchange with the exiting product water and the blowdown exiting from the boiler 20. Heating the feed water by heat exchange reduces the amount of energy needed to boil the incoming feed water in the boiling chamber 21. From the heat exchanger 8, the heated feed water travels through the degasser channel 67, and enters the boiling chamber 21 where it is boiled by heater 15. Steam exiting the boiling chamber 21 via the cyclone demister 23 travels to the heat exchanger 8 from which it exits as processed product water after cooling by heat exchange with the feed water and cooling water.

The device includes a control mechanism for maintaining sufficient liquid in the boiler chamber 21, such as a bolt valve 24 (FIG. 1 and FIG. 12). The float valve 24 regulates the level of fluid in the boiler chamber 21 by permitting excess water containing contaminants remaining after boiling, which is called "blowdown," to exit. The float valve 24 also operates to prevent blowdown from exiting the boiling chamber 21 when the water level drops below a predetermined level. Blowdown exits via the float valve 24 into the heat exchanger 8 where it is cooled by heat exchange with the feed water before exiting the device 1. Noncondensible gases with some steam exit the boiler 20 via the degasser channel 67 and enter the heat exchanger 8 where they participate in heat exchange with the cooling water. The cooling water combines with the blowdown, before exiting the device 1 as waste water, for example into a drain in a sink.

As shown in FIGS. 1 and 13, wiper 6 is operated by wiper motor 5 via reduction gear 29 in rotational contact with wiper shaft 28 to remove deposits from the bottom surface of the boiler chamber 21. Wiper motor 5 can be a standard electric AC or DC motor. A steam motor can also be used instead of an electric motor. In this embodiment, a steam rotor that is rotated by entering steam is placed in the cavity of the demister 23 and is used to drive the pinion gear 32 which in turn rotates the reduction gear 29 to operate the wiper 6.

The device 1 preferably includes a thermal overload mechanism 34 (FIG. 2) with automatic reset to enhance safety of the device, by detecting when excessive temperatures (e.g. above 230° F.) are reached by the heater, for example when there is insufficient water in the boiler chamber 21. The sensor of thermal overload mechanism 34 passes from the base 2 of the device 1 via a copper or aluminum connector upward in the device through aperture 80 in lower plate 9, feed water/blowdown heat exchange plate 10, feed/cooling water channel plate 11, product/feed water heat exchange plate 12, and upper plate 13 of the heat exchanger to contact the heater 15.

Typical parameters for operating the water processing device are a water inlet pressure of 30 to 120 PSI, with water flow restrictors 35 and 36 inserted to regulate the flow of the feed water (35) and cooling water (36) into the heat exchanger 8. For example, the feed water and cooling water restrictors 35 and 36 restrict their respective water flows into the heat exchanger 8 to approximately 1 GPH. In addition, a vent restrictor 37 may be used to regulate the amount of steam produced in the boiler 20 and used in the degasser channel 67 to remove gases and volatile liquids from the feed water. As an example, the vent restrictor 37 may be used to permit approximately 5% of the total steam produced to flow into the heat exchanger 8, leaving approximately 95% of the steam to exit the cyclone demister 23 into the heat exchanger 8 where it is cooled to produce the processed product water. In this example, the product water will exit the heat exchanger 8 at the rate of approximately ⅕ GPH and waste water will exit at the rate of approximately 1⅕ GPH. The waste (drain) water includes the cooling water, blowdown and vented gases. The heater 15 providing approximately 500 watts of power will produce the processed product water at approximately ⅕ GPH using these parameters in the device 1 described herein.

Figure 3:
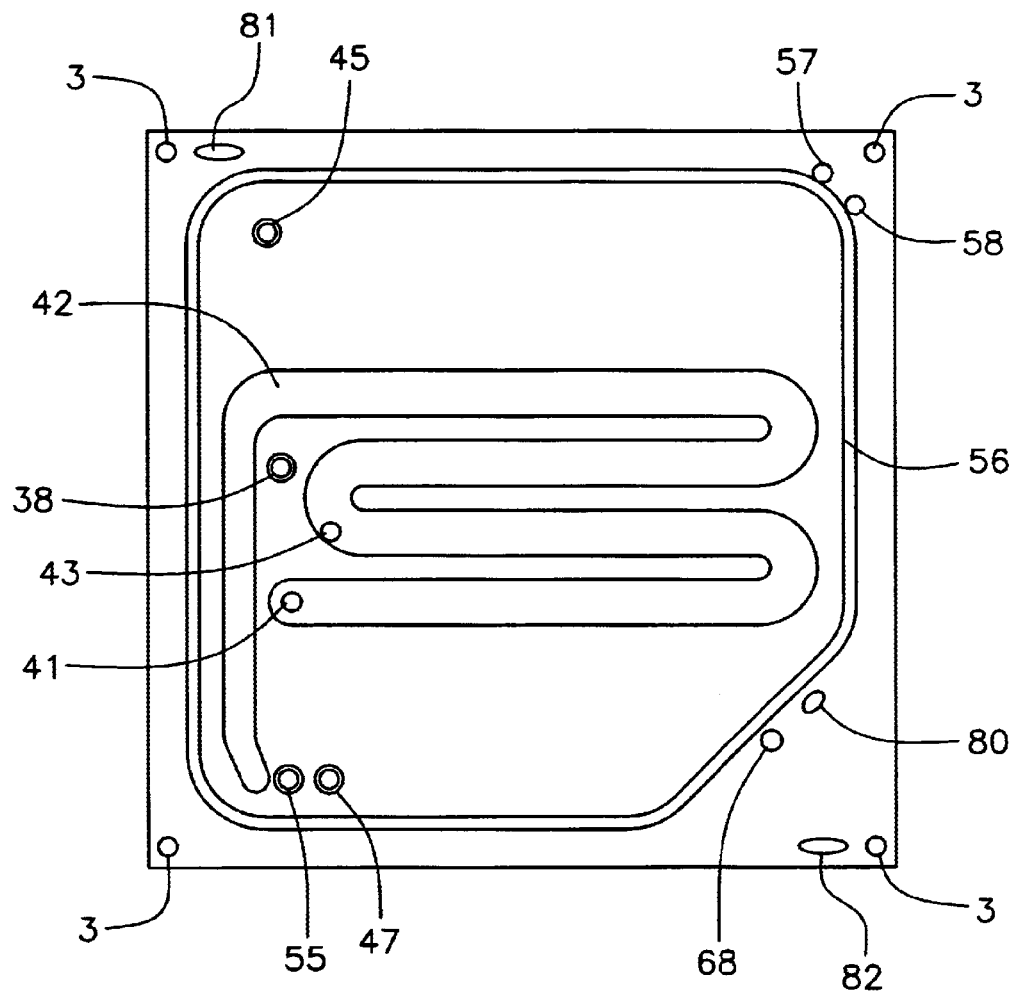
FIG. 3 is a top view of the lower plate of the heat exchanger component of the water processing device of the invention having flow directing water channels.
Figure 4:
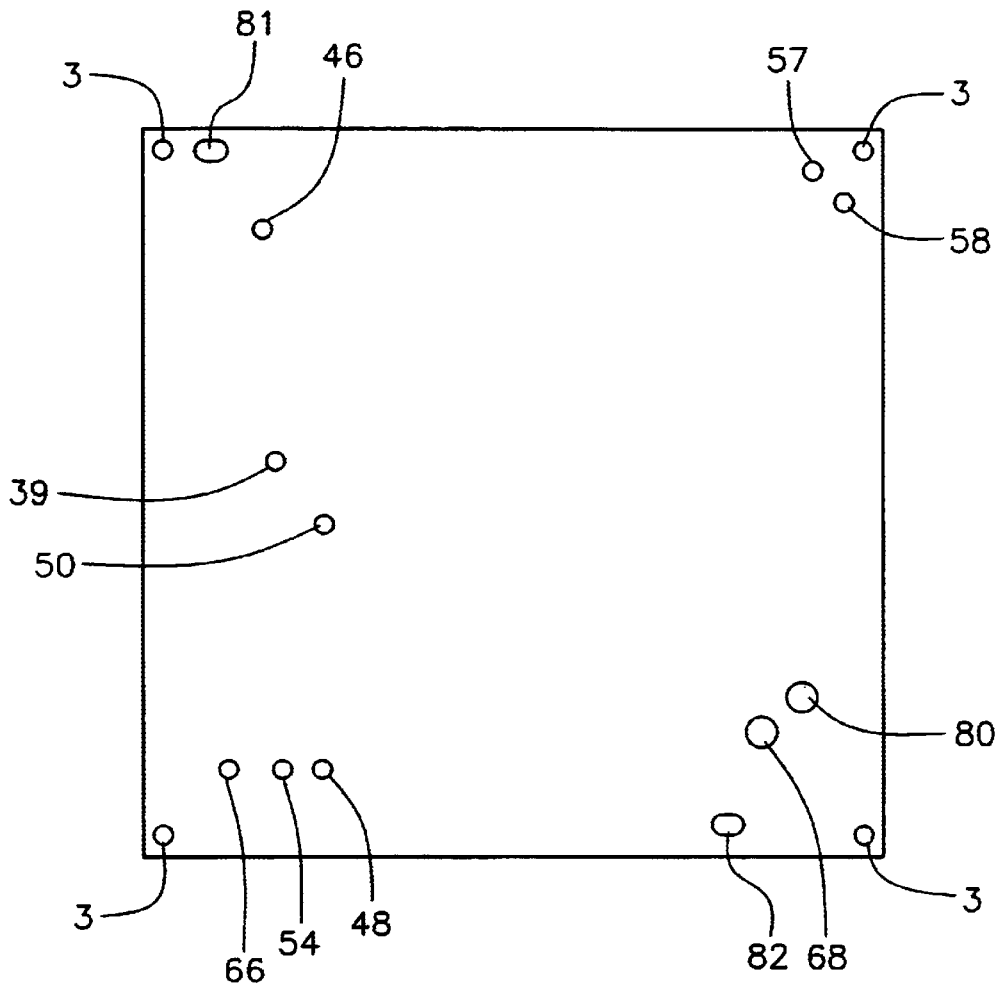
FIG. 4 is a top view of the lower heat exchange plate of the heat exchanger of the water processing device.
Figure 5:
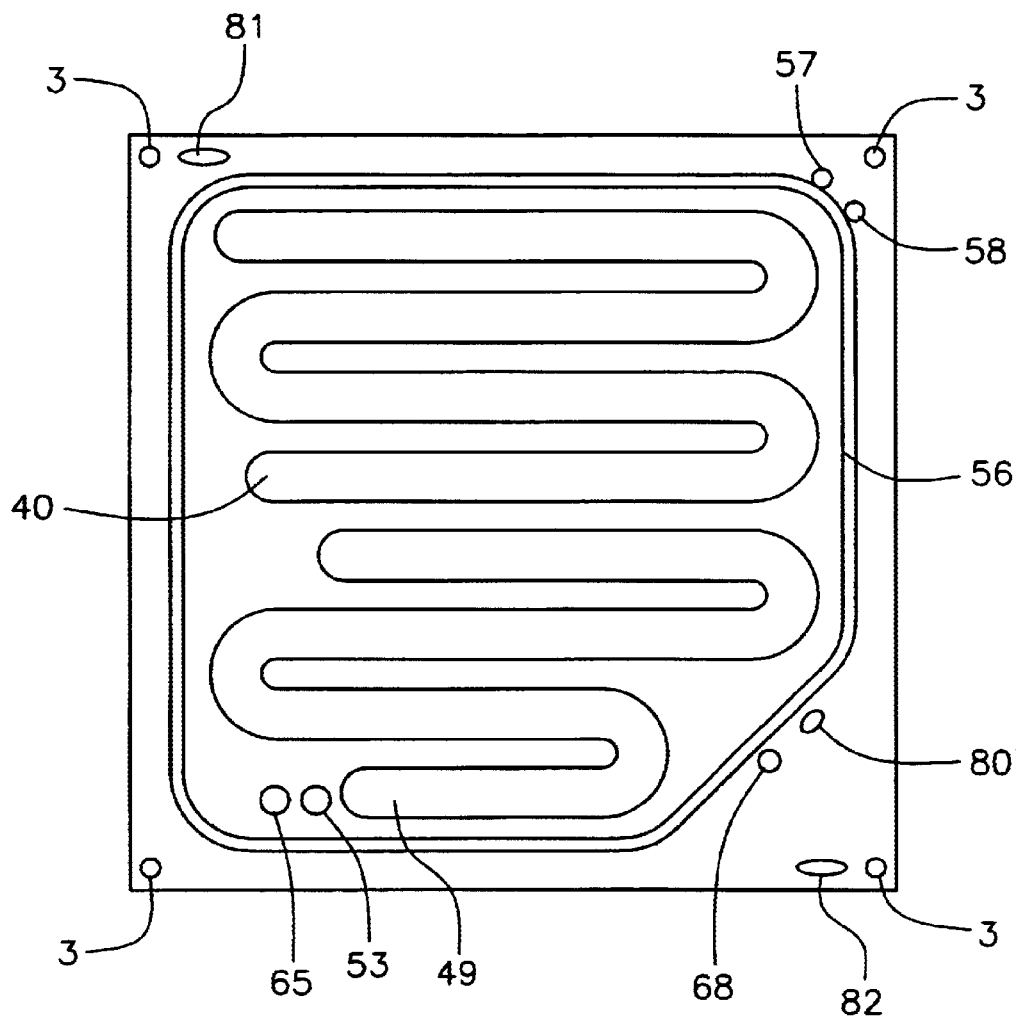
FIG. 5 is a top view of the feed-cooling water channel plate of the heat exchanger component of the water processing device of the invention having flow directing water channels and located between the lower and upper heat exchange plates of the heat exchanger.
Figure 6:
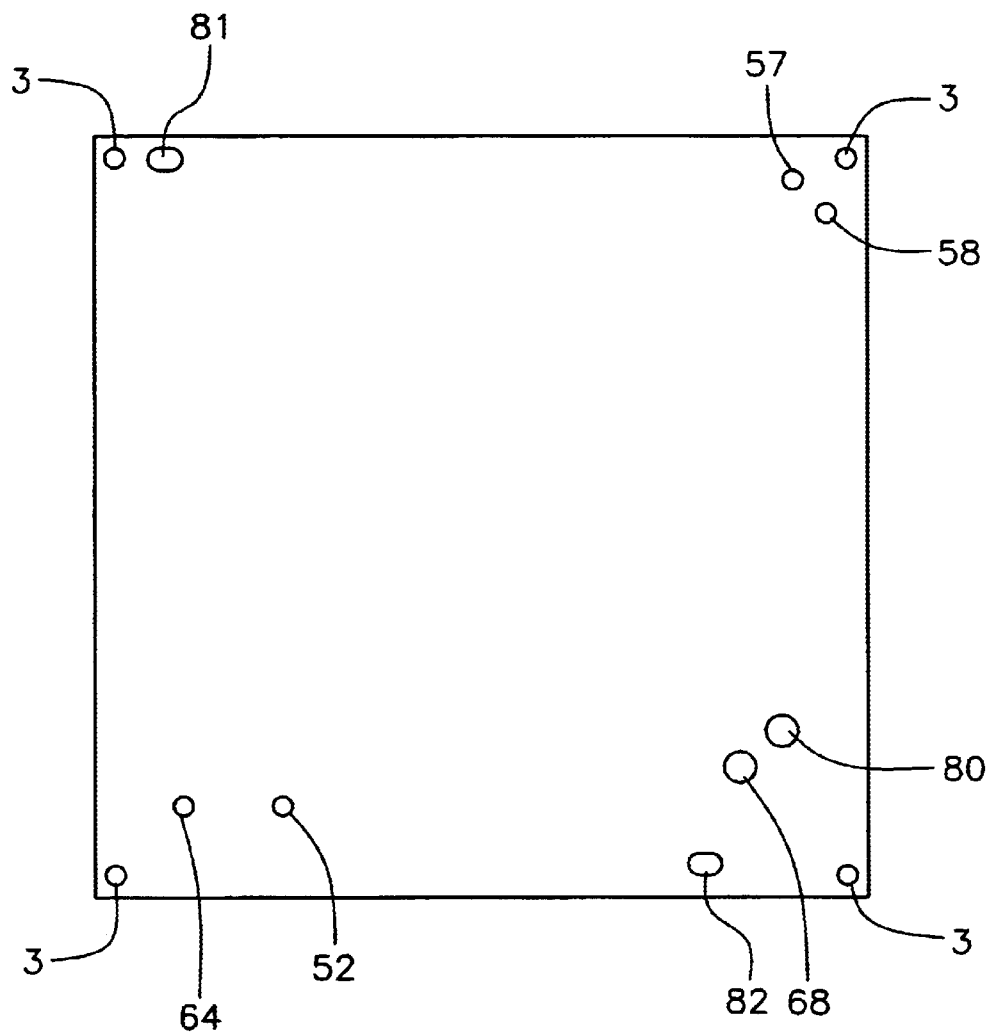
FIG. 6 is a top view of the upper heat exchange plate of the heat exchanger of the water processing device.
Figure 9:
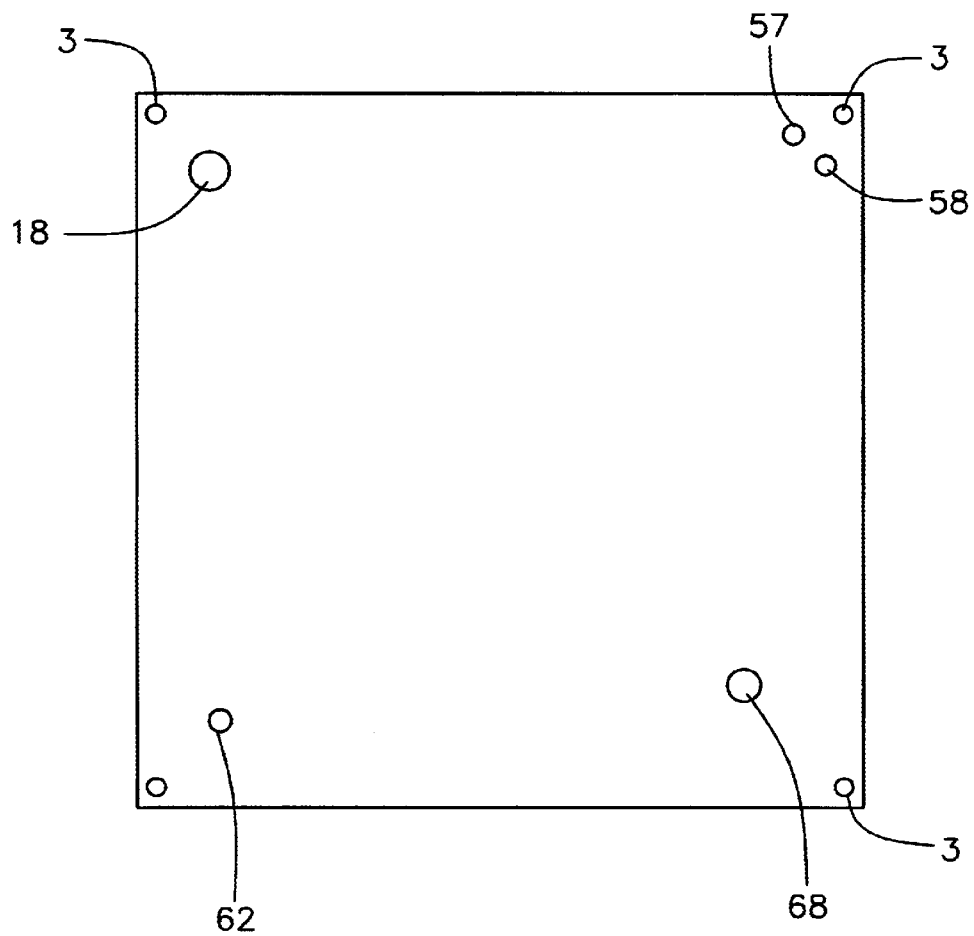
FIG. 9 is a top view of the boiler surface plate of the water processing device.

It is illustrative to trace the flow of the various fluids and gases through the device 1. As described above, incoming feed water entering the device 1 passes through the solenoid valve 7 and then passes through water restrictor 35 and flows into the heat exchanger 8. Feed water/blowdown heat exchange plate 10 (FIG. 4) is inserted between lower plate 9 and feed/cooling water channel plate 11 as shown in FIG. 1. Feed water enters the heat exchanger 8 through aperture 38 in lower plate 9 (FIG. 3) and passes through feed water/blowdown heat exchange plate 10 at aperture 39 (FIG. 4). The feed water then enters water channel 40 which is cut out (has no floor) in feed/cooling water channel plate 11 (FIG. 5). Vented noncondensible gases and steam exiting from the degasser/demister plate 26 enter lower plate 9 at aperture 41 into flow directing channel 42 and exit at aperture 43 (FIG. 3). Blowdown from the boiler exits the float valve 24 at aperture 61 (FIG. 12) and passes down through the device, passing through aperture 61 in boiler chamber 21 (FIGS. 10A, B), down through aperture 62 in boiler surface plate 16 (FIG. 9), through aperture 63 in upper plate 13 (FIGS. 7A and 7B), down through aperture 64 in product/feed water heat exchange plate 12 (FIG. 6) and through aperture 65 in feed/cooling water channel plate 11 (FIG. 5) and down through aperture 66 in feed water/blowdown heat exchange plate 10 (FIG. 4) to enter flow directing channel 42 in plate 9 (FIG. 3). The feed water travelling in water channel 40 in plate 11 becomes heated by heat exchange through plate 10 with blowdown travelling in flow directing channel 42 and exiting at aperture 43 in lower plate 9 (FIG. 3) and by heat exchange through plate 12 with hot product (steam) travelling in flow directing channel 44 of upper plate 13 (FIG. 7). The heated feed water exits out of channel 40 in feed/cooling water channel plate 11 (FIG. 5) through aperture 46 in feed water/blowdown heat exchange plate 10 (FIG. 4) and out of the heat exchanger 8 through aperture 45 in lower plate 9 (FIG. 3). The heated feed water can then travel via a conduit (e.g. a plastic or rubber tube) to aperture 57 in plate 9, and upward in the device via aperture 57 in plates 10, 11, 12, 13, 16, and boiler chamber 21 to enter the degasser channel 67 at slot 69.

Cooling water that is used to cool the product water enters the heat exchanger 8 at aperture 47 in lower plate 9 (FIG. 3) passes through aperture 48 in feed water/blowdown heat exchange plate 10 (FIG. 4) and enters water channel 49 in feed/cooling water channel plate 11 (FIG. 5). After travelling in water channel 49, where it cools the vented gases and steam that have exited the degasser channel 67 and are travelling in lower portion of water channel 42 in lower plate 9 (FIG. 3), the warmed cooling water moves downward in the device via aperture 50 in feed water/blowdown heat exchange plate 10 (FIG. 4), to join the cooled vented gases and blowdown exiting as waste (drain) water, for example via plastic or rubber conduits.

The hot processed product water travelling as "dry" steam exits the cyclone demister 23 and travels in channel 44 of upper plate 13 (FIG. 7) where it is converted to water by heat exchange through product/feed water heat exchange plate 12 (FIG. 6) with the feed and cooling waters travelling in water channels 40 and 49 of feed/cooling water channel plate 11 (FIG. 5) as described above. The cooled product water exits at one end 51 of water channel 44 (FIG. 7) and moves down through aperture 52 in product/feed water heat exchange plate 12 (FIG. 6), continuing down through aperture 53 in feed water/cooling water channel plate 11 (FIG. 5) and out aperture 54 in feed water/blowdown heat exchange plate 10 (FIG. 4) and exits the heat exchanger 8 from aperture 55 in lower plate 9 (FIG. 3). The product water then exits the device, for example via plastic or rubber conduits.

Plates 9, 10, 11, 12, 13 and 16 as well as boiler chamber 21, boiler top plate 25 and demister/degasser plate 26 all have holes 3 for screws or bolts 4 in their four corners. Plates 9, 11 and 13, and boiler chamber 21 and demister/degasser plate 26 also have grooves 56, for example 0.050 inches deep, 0.090 inches wide for receiving rubber or plastic O-rings, for example having a diameter of 0.07 inches, to prevent air and water leakage in the device (FIGS. 3, 5, 7, 10 and 11). Alternatively, plates 9, 10, 11, 12, 13 and 16 can be bonded together, for example using a high temperature epoxy such as produced by mixing resin no. 2846 and hardener 3611 manufactured by PTM&W Industries, Santa Fe Springs, Calif., to prevent leakage. Degasser plate 26 may also be bonded in this manner to boiler chamber 21. In addition, plates 9, 10, 11, 12, 13 and 16 have apertures 57 and 58 for movement of heated feed water up through the device into the boiler (aperture 57) and for vented steam and gases from the degasser (aperture 58) down through the device 1.

In one embodiment, lower plate 2 can be 7 inches long by 7 inches wide by ¹⁄₁₆ inch thick made of a suitable material such as plastic. Heat exchange plates 10 and 12 may be 7 inches long by 7 inches wide by 0.010 inch thick. Feed water/cooling channel plate 11 can be 7 inches long by 7 inches wide by 0.05 inch thick. Lower plate 9 and upper plate 13 of the heat exchanger 8 may be 7 inches long by 7 inches wide by 0.5 inch thick. Boiler surface plate 16 may be 7 inches long by 7 inches wide by 0.06 inch thick. Boiler chamber 21 may be 7 inches long by 7 inches wide by 2 inches thick. Demister/degasser plate 26 can consist of a degasser channel 67 of approximately 20 inches in length, 1 inch wide and 0.75 inch deep in a plate 7 inches long by 7 inches wide by 1 inch thick. The cover for the device in this embodiment is of sufficient depth to enclose the various components of the device, for example the cover can be approximately 7.25 inches long by 7.25 inches wide by 5 inches high. The dimensions of the reduction gear 29 can be 6½ inches in diameter. These dimensions are provided by way of example and may be varied as needed to optimize manufacture and/or performance of the device.

Figure 8B:
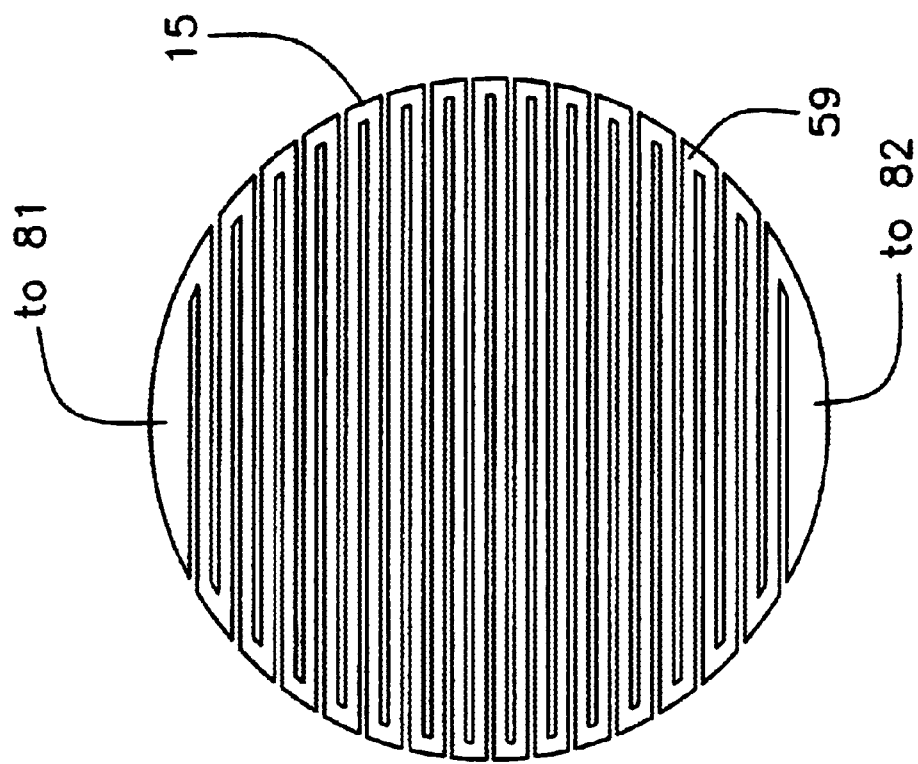
FIG. 8 depicts the heating element of the water processing device of the invention and an insulating plate.
Figure 8A:
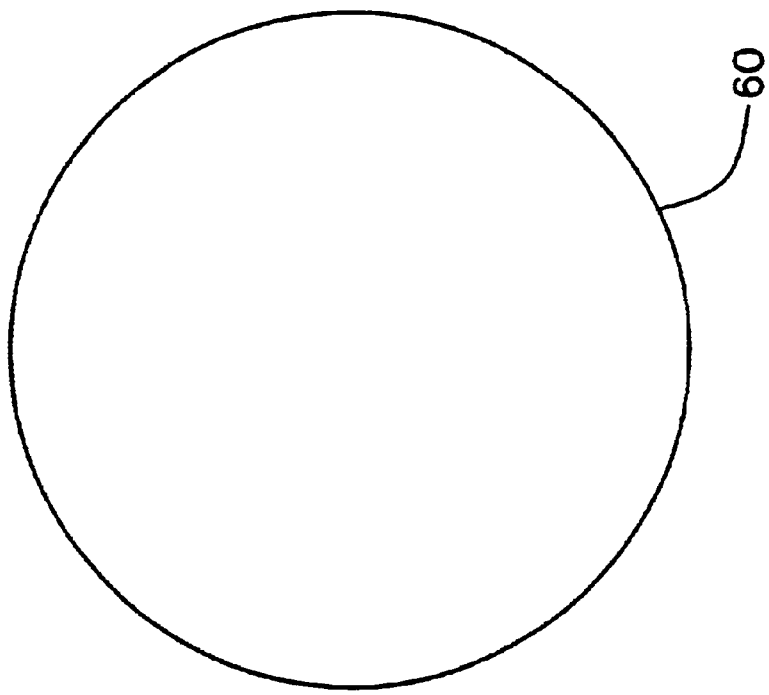

Above the feed/cooling water channel plate 11 (FIG. 5), is product/feed water heat exchange plate 12 (FIG. 6), over which lies upper plate 13 (FIG. 7A) having heater cavity 14 for receiving heater 15 consisting of heater element 59 attached to insulator plate 60 (FIG. 8). On the bottom of plate 13 (FIG. 7B) is water flow channel 44 in which the dry steam exiting the cyclone demister 23 travels after entering the heat exchanger 8 via the steam tube 17 through aperture 19 in upper plate 13 (FIGS. 1 and 7). Channel 44 is completed by the bottom of the upper plate 13 and may be ¼ inch in depth.

Heater 15 consists of heater element 59 attached to insulator plate 60 as depicted in FIG. 8. The heater element 59 is composed of suitable electricity conducting materials including, but not limited to, stainless steel. The element is adhered to an insulator plate 60 (FIG. 1) of suitable high temperature resistant material such as a high temperature epoxy or Teflon®. The amount of energy produced by the heater element 59 is a function of the resistance of the material used to form the element which in turn is a function of the thickness and width of the material used and its total path length. For example, for a heating element made of 0.002 inch thick stainless steel having a width of 0.5 inch and a total path length of approximately 150 inches, the resistance from end of the element to the other is approximately 29 ohms. If 120 volts of power is supplied to this element, approximately 500 watts of energy in the form of heat will be produced.

Above the heater 15 is boiler surface plate 16 (FIG. 9) having aperture 18 for abutting steam tube 17 and aperture 62 for downward passage of hot blowdown from the float valve 24. As noted above, plate 16 also has apertures 57 and 58. Boiler surface plate 16 also has aperture 68 for motor shaft 33 and motor shaft extension 31.

Referring to FIGS. 10 and 11, heated feed water from the heat exchanger 8 enters the steam stripping degasser plate 26 into the degasser channel 67 at slot 69 (FIG. 11) upward from aperture 57 in the boiler chamber 21 (FIG. 10), where it is degassed by steam from the boiler 20 that has exited the boiler chamber 21 at aperture 70 (FIG. 10). The degassed hot feed than exits the degasser channel 67 and enters the boiler at aperture 70 where a portion is converted to steam. Steam from the boiler chamber 21 enters the cyclone demister 23 (FIG. 11) at channels 71 and 72 (FIG. 10) and forms a whirling funnel form or cyclone (in the counterclockwise direction) in the cyclone demister 23 (FIG. 11). As a result of centrifugal force in the cyclone demister 23, water droplets containing contaminants are removed from the steam and flow back through the mist return channel 73 into the boiler chamber 21 (FIG. 10). The product exits as "dry steam" from the cyclone demister 23 down through steam tube 17 and through aperture 18 in boiler surface plate 16 (FIG. 9) into water channel 44 via aperture 19 in the upper plate of the heat exchanger (FIG. 7). Noncondensible gases and some steam exit the degasser channel 67 at slot 74 passing downward through aperture 58 in the boiler chamber 21 (FIG. 10) down to the heat exchanger 8. Apertures 75 in the boiler chamber 21 (FIG. 10) and 27 in the demister/degasser plate 26 (FIG. 11) permit the shaft 28 of the reduction gear 29 to pass encased within water seal 30 which prevents steam from leaking from the boiler 20.

As shown in FIG. 12, the float valve 24 consists of a float 76 that moves up and down within the float valve chamber 77 with the level of fluid in the boiler chamber 21, and upper and lower channels 78 and 79 that permit the movement of steam and water to and from the boiler chamber 21 into the float valve chamber 77. The float valve chamber 77 can be, but is not limited to dimensions of 2 inches in height and 1 inch in diameter. The float 76 can be, but is not limited to dimensions of ¾ inch in height and ⅞ inch in diameter. As the fluid level in the boiler chamber 21 decreases, the float 76 moves downward and blocks aperture 61, preventing blowdown from continuing to exit the boiler. As the fluid level in the boiler chamber 21 increases, the float 76 is pushed upwards, unblocking aperture 61, permitting blowdown to continue exiting the boiler chamber 21. The construction of the float valve 24 permits the steam pressure in the boiler chamber 21 and the float valve chamber 77 to equalize so that the level of water in both the float valve chamber 77 and the boiler chamber 21 is the same.

The wiper mechanism for cleaning the boiler surface plate is shown in detail in FIG. 13. Wiper 6 contacts the upper surface of boiler surface plate 16, rotating around shaft 28 of reduction gear 29 to remove surface deposits, such as scale buildup, from the surface plate 16. The shaft 28 is encased in water seal 30. The wiper may be made of any suitable firm material such as rubber or plastic, and in the embodiment described herein using plates of dimensions 7 inches long by 7 inches wide, the wiper is preferably 6 inches in diameter.

Water seal 30 is a novel component that prevents steam from leaking out of the device around the reduction gear shaft 28. As seen in FIG. 13, water seal 30 is a tube that surrounds the reduction gear shaft 28 starting below the reduction gear 29 and extends down through aperture 27 of the demister/degasser plate 26 into the cavity 22 of boiler chamber 21. The tube of the water seal 30 is of greater diameter than the diameter of the reduction gear shaft 28. The bottom 87 of the water seal 30 lies below the surface of the water in the boiler chamber cavity 22. Water in the boiler moves into the bottom of the water seal and Up until a point of equilibrium where the weight of the water inside the tube of the water seal 30 is equal to the pressure above the water level in the cavity 22. The top of water seal 30 extends to a sufficient height to prevent water inside from rising above the top. This prevents steam in the cavity 22 from leaking up and out of the device around the reduction gear shaft 28 and provides a long-lasting seal.

Apertures 81 and 82 (FIGS. 3, 4, 5, 6 and 7) provide for passage of electrical power leads to the heater (FIG. 8B).

Uses of the Compact Water Processing Device of the Invention

The water processing device of the invention has a number of uses. The device is used to remove contaminants from tapwater, and can be used to purify seawater or wastewater, for example during droughts, or in areas where fresh water is scarce. The costs of operating the device continuously are well within the budget of many American consumers, and could be made available through various forms of assistance to a broader group of consumers worldwide.

While several illustrative embodiments of the invention have been shown and described, numerous variations and alternate embodiments will occur to those skilled in the art. Such variations and alternate embodiments are contemplated, and can be made without departing from the spirit and scope of the invention, as defined in the appended claims and equivalents thereof. The embodiments are not intended in any way to otherwise limit the scope of the disclosure of the protection granted by Letter Patent granted hereon.

What is claimed:

1. A water processing device for removing contaminants from incoming feed water comprising:

a) a heat exchanger or for heating incoming feed water end cooling outgoing product water;

b) a boiler having a cavity and an upper surface and a bottom surface of the cavity for receiving and boiling the feed water from the heat exchanger to generate product in the form of steam;

c) a heater for boiling said feed water in the boiler;

d) a degasser for removing noncondensible gases from said feed water;

e) a demister for removing droplets containing contaminants from the product steam, whereby the product steam exiting from the demister is cooled to liquid form in said heat exchanger and recovered as processed liquid product; and f) a mechanism for preventing and/or removing surface deposits from the surfaces of tile boiler.

2. The water processing device of claim 1, wherein said heat exchanger comprises;
   a) a first plate containing a flow directing channel for flow of hot blowdown and vented gases from the boiler, said blowdown travelling in one portion of the flow directing channel and said vented gases travelling in an adjacent portion of said flow directing channel;
   b) a second plate containing a flow directing channel for flow of incoming feed water and a flow directing channel for flow of incoming cooling water;
   c) a third plate inserted between the first plate and the second plate for heat exchange between the blowdown in the flow directing channel in the first plate and the incoming feed water in the flow directing channel in the second plate and between the vented gases in the water flow directing channel in the first plate and the cooling water flowing in the flow directing channel of the second plate, such that said blowdown heats said incoming feed water and said cooling water cools said vented gases;
   d) a fourth plate containing flow directing channels for the product steam exiting from the demister; and
   e) a fifth plate inserted between the second plate and the fourth plate for heat exchange between the product steam and incoming feed water and cooling water, such that said product water in the flow directing channels in the fourth plate is cooled by said cooling water in said flow directing channel in said second plate and said feed water in the flow directing channel in said second plate is heated by said product steam.

3. The water processing device of claim 1, further comprising a liquid level control device for regulating the volume of water in the boiler.

4. The water processing device of claim 1, further comprising a shaft for operating said wiper mechanism, said shaft located in the cavity of said boiler and extending through an aperture in the upper surface of said boiler.

5. The water processing device of claim 4, further comprising a water seal comprising a hallow tube surrounding the shaft, the bottom of said hollow tube located beneath the water level in said cavity of the boiler and the top of said hollow tube located above the water level in the hollow tube during use, and the diameter of said hollow tube greater than the diameter of said shaft.

* * * * *